(12) United States Patent
Palacios

(10) Patent No.: US 8,408,913 B2
(45) Date of Patent: Apr. 2, 2013

(54) SYSTEM, METHOD, COMPUTER PROGRAM AND DATA SET WHICH ARE INTENDED TO FACILITATE LANGUAGE LEARNING BY MEANS OF SOUND IDENTIFICATION

(75) Inventor: Angel Palacios, Madrid (ES)

(73) Assignee: Linguaversal, SL, Madrid (ES)

( * ) Notice: Subject to any disclaimer, the term of this patent is extended or adjusted under 35 U.S.C. 154(b) by 1115 days.

(21) Appl. No.: 10/596,991

(22) PCT Filed: Jan. 7, 2005

(86) PCT No.: PCT/ES2005/000006
§ 371 (c)(1),
(2), (4) Date: Jul. 4, 2006

(87) PCT Pub. No.: WO2005/066916
PCT Pub. Date: Jul. 21, 2005

(65) Prior Publication Data
US 2007/0015122 A1    Jan. 18, 2007

(30) Foreign Application Priority Data
Jan. 8, 2004  (ES) .................................. 200400030

(51) Int. Cl.
*G09B 19/00*  (2006.01)
(52) U.S. Cl. ........................................ 434/156; 434/157
(58) Field of Classification Search .................. 434/156, 434/167, 157, 169; 704/4, 9
See application file for complete search history.

(56) References Cited

U.S. PATENT DOCUMENTS

| | | | |
|---|---|---|---|
| 3,724,102 A * | 4/1973 | Van Patten | 434/157 |
| 5,336,093 A * | 8/1994 | Cox | 434/178 |
| 5,393,236 A | 2/1995 | Blackmer et al. | |
| 5,651,678 A * | 7/1997 | Phillips | 434/170 |
| 5,697,789 A | 12/1997 | Sameth et al. | |
| 5,799,267 A * | 8/1998 | Siegel | 704/1 |
| 5,802,533 A * | 9/1998 | Walker | 715/201 |
| 6,397,185 B1 * | 5/2002 | Komissarchik et al. | 704/270 |
| 6,409,510 B1 | 6/2002 | Firebaugh | |
| 6,869,286 B2 | 3/2005 | Furry | |
| 6,963,841 B2 | 11/2005 | Handal et al. | |
| 7,011,525 B2 * | 3/2006 | Mejia | 434/167 |
| 7,052,278 B2 | 5/2006 | Johnson et al. | |
| 7,085,707 B2 | 8/2006 | Milner | |
| 7,104,798 B2 | 9/2006 | Spaventa | |
| 7,149,690 B2 | 12/2006 | August et al. | |
| 7,165,972 B1 | 1/2007 | Jones | |
| 7,409,348 B2 | 8/2008 | Wen et al. | |
| 8,033,831 B2 | 10/2011 | Julia et al. | |
| 8,202,093 B2 | 6/2012 | Raya et al. | |

OTHER PUBLICATIONS

Steven Pinker, "The Language Instinct", 1994.(locations 5782-5808 in kindle edition).
Jerzy Zybert and Sabina Stepien, "Musical Intelligence and Foreign Language Learning," Research in Language, vol. 7, p. 101.
Larry Vandergrift, "Second Language Listening", in Handbook of Research in Second Language Teaching and Learning vol. 2, ed by Eli Hinkel, Routledge, NY (p. 455).
Multimedia course: "Berlitz German Premier". http://amazon.com/Nova-Development-US-Berlit-Premier/dp/B003CVR1YW/ref=sr_1_4?Ie=UTF8&qid=1346092009&sr=8-4&keywo.
Martha Young-Scholten. "The negative effects of 'positive' evidence on L2 phonology", in "The Current State of Interlanguage", John Benjamins Publishing Company, 1995.
Wayne B. Dickerson, "Orthography as a pronunciation resource", World Englishes World Englishes, 1987, 6(1), p. 11-20 (p. 12).
Vivian Cook. "Second Language Learning and Language Teaching", Hodder Education, London 2008 (p. 4).
Marc Brysbaert "Bilingual visual word recognition: Evidence from masked...", in "Masked priming: State of the art", S. Kinoshista, S.J. Lupker, Psychology Press 2003.
Brysbaert affiliation, Department of Experimental Psychology http://crr.ugent.be/members/marc-brysbaert.
Berlitz method: http://www.berlitz.us/Berlitz-Method/165/.
Berlitz-Tellmemore demo: http://www.eberlitz.com/v9/portalCOR/modportalCOR.axrq.
Assimil method. http://www.assimil.com, http://www.assimil.com/method.do;
jsessionid=50ABEA4B6EE339C38E1804229DDDFC2E?methodes.
G. Lukatella and M. T. Turvey M. T, "Visual lexical access is initially phonological: 1. Evidence from as_" Journal of Experimental. Psychology: General, 123, (p. 107,122).
M. Brysbaert at el., "Visual Word Recognition in Bilinguals: Evidence From Masked Phonological Priming", Journal of Experimental Psychology: H . . . , 1999, vol. 25, No. 1, (p. 145).
W. Duyck, "Translation and associative priming with . . . ". Journal of experimental psychology Learning memory and cognition, 2005, 31(6), (p. 1340).
Normal Doidge "The Brain that Changes Itself" 2007 (Location 2002 in Kindle edition).

* cited by examiner

*Primary Examiner* — Xuan Thai
*Assistant Examiner* — Peter Egloff

(57) ABSTRACT

The invention is intended to facilitate language learning by improving sound identification and perception. It is well known that foreign language students in particular have great difficulty in mastering the sounds of the foreign language being learned. Among other possible causes, this is due to interferences that occur between the written form of the target language and the sounds that the students associates mentally with used in the written form. In the case of foreign language learning, the aforementioned association comes fundamentally from the native language of the learner. The invention relates to a training method for learning languages involving the use of graphic entities which enable the sounds of the target language to be manipulated without creating interferences between the writ en and spoken form.

22 Claims, No Drawings

SYSTEM, METHOD, COMPUTER PROGRAM AND DATA SET WHICH ARE INTENDED TO FACILITATE LANGUAGE LEARNING BY MEANS OF SOUND IDENTIFICATION

INDUSTRIAL FIELD

The current invention belongs to the area of language learning, in particular to the area of learning of oral comprehension and pronunciation.

PRIOR ART

References

The following references show the prior state and also show general knowledge that will be employed to explain this invention.

[1] Anderson, S. R., Lightfoot, D. W. (2002): "The language organ: linguistics as cognitive physiology", New York: Cambridge University Press.
[2] Auralog: Foreign language course: "Talk to me".
[3] Borden, G. J., Harris, K. S., Raphael, L. J. (1994): "Speech Science Primer: Physiology, Acoustics and Perception of Speech", Williams and Wilkins.
[4] Boysson-Bardies, B. (2001): "How Language Comes to Children", The MIT Press, Cambridge.
[5] Goldsmith, J. (1995): "The Handbook of Phonological Theory", Cambridge Mass., Blackwell Publishers.
[6] Kager, R. (1995): The Metrical Theory of Word Stress, en [Goldsmith (1995)]
[7] Ladefoged, P. (2001): "Vowels and Consonants", Malden, Mass.: Blackwell Publishers.
[8] Ohala, J. (1995): Experimental Phonology, en [Goldsmith (1995)]
[9] Palacios (2003): Patent application ES2003/02943. It has been used as priority for the PCT application published as WO 2005/055691.
[10] Quilis, A., Fernández, J. (1975): "Curso de fonética y fonología españolas para estudiantes angloamericanos" (Course on Spanish phonetics and phonology for Anglo-American students), CSIC
[11] Tomatis, A. (1996): "The Ear and Language", Moulin, Canada.

The path to learning a foreign language is full of obstacles for the adult learner. Learners usually reach situations in which the language they are learning phosilizes, ending up in a status that is very distant from the target language they were trying to learn.

The most difficult aspect is pronunciation, i.e. phonetics and phonology. It is extremely unusual for an adult to obtain native like pronunciation. This is a difficult aspect of language. When compared to syntax, there are very few reports on how phonetics and phonology are learned, and there are also very few solutions about how to solve this problem.

A view about the difficulty in learning phonetics and phonology is that the problem is the lack of training of the vocal tract. The usual pedagogical recommendation that is associated to this approach is to utter oral fragments of the target language in a repetitive fashion. Sometimes, diagrams are showed that explain the learner how he/she must use the muscles of his/her vocal tract.

Some pedagogical products try to assist the learner to develop his/her pronunciation by performing an automated evaluation of the waveform of the sound that they generate. In these cases, the learner can use this mechanism to evaluate the quality of his/her pronunciation [Auralog].

Another approach to this problem is the one by Alfred Tomatis [Tomatis]. Tomatis suggested, as a result of his scientific research, that the problem is actually located in the ear. He proposes a pedagogical system that is based on training the ear in a certain fashion, which is based on inputting sound samples in which some frequencies have been intensified and others have been attenuated. The idea is that this action will reduce the atrophy of those areas, and that the subject will be able to better perceive the sounds of language, and therefore will also be able to better produce them.

Unfortunately, none of these approaches is the definitive solution for the learning of the pronunciation in foreign languages. The current invention uses the existing scientific knowledge about language learning to identify the area where the main problem lies, and proposes an approach to solve it.

EXPLANATION OF THE INVENTION

Problem Analysis

Difficulties in Learning Pronunciation

Learning pronunciation is based on two aspects:

Learning phonetics, i.e. learning the features that characterize the individual sounds that make up speakers' utterances. These features are basically associated to the profile of the frequency power spectrum of the sound. In order for the learner to learn these features, he/she must first identify them and then remember them.

Learning phonology, i.e. learning how the sounds of a word or of a sentence influence each other and how they relate among themselves. Also, how the temporal evolution of certain features, such as frequency or intensity, contribute to convey the structure and the meaning of language. Because phonology is based on sounds' features, learning phonology is based on learning phonetics.

Very young infants, of just a few weeks or months old, can identify the features of the sounds of all languages. However, this ability becomes gradually lost, despite it has been seen that there always remains a latent capacity that can be trained.

The consequence of this difficulty to identify sounds is that it is not possible to remember them because, How is it possible to remember something that cannot be identified?. Simultaneously, the inability to learn phonetics causes a concomitant inability to learn phonology. That is to say, if individual sounds cannot be learned, How could it be possible to learn the relationships among those sounds.

As a result of these difficulties to learn phonetics and phonology, the learner faces three fundamental problems:

The learner experiences serious problems to learn words, because learning a word is learning a sequence of sounds, and those sounds are difficult to learn.

Because the learner does not learn phonology, he/she also finds serious difficulties in discriminating the words in an automated and unconscious way. Much scientific work has been done about the process that the brain uses to identify words. An important part of this process lies on cues provided by phonology. For example, the sequence of Spanish sounds "lavacalentita" can corresponds to two different word groups: "la vaca lentita" or "lava calentita". Phonology allows the listener to discriminate the right words in this case [Quilis et al 1975]. Therefore, when the learner has problems with phonology, he/she also has problems in correctly discriminating words.

Because the learner does not learn phonology, he/she also loses the ability to identify the syntactic structure of the messages that are listened to. Science has shown that the information about such structure is conveyed by the changes in frequency, intensity and duration of the sounds of language.

In order to overcome the previous difficulties, it is customary to resort to written texts. For the learner, it is much easier to remember the written form of a word than the oral form, because in most cases written characters can be easily identified and memorized. Besides, the learner has enough time to analyze the words that exist in a given sentence, and elucidate the structure of the sentence.

The result is that, in general, the foreign language learners get in contact with written language very early in the learning process. It is difficult to find a language course that does not use a text book. The consequence of this is that a large part of the words that are learned, are learned after their written forms.

The present invention is based on the idea that using written text too early in the process of language learning creates difficulties for learning phonetics and phonology. After analyzing this idea, the present invention provides a way for language learning and training while allowing at the same time the learner to discriminate words and identify the structure of sentences, but without suffering the negative effects caused by prematurely using writ en texts.

Analysis of the Relation Between Language's Visual Form and Phonologic Form.

In general, modern science believes that there are a number of rules or relationships between the visual form and the phonologic form of words, and that these relationships influence the way in which the speaker can use words.

These rules or relationships include as well some aspects about the characters that are used in the language. That is to say, if a person has become accustomed to associating a certain sound with the letter "b", for example, she will have a tendency to associating that sound to those words that contain that letter, even in a foreign language, so that learning words after their visual form will be influenced by it.

The Stroop effect [Possner et al 1999] provides information related to this. In order to study the Stroop effect, subjects are shown different words that designate colors which are written using different colors. The tasks that subjects have to do is to name the colors in which the words are written. Apparently this task is easy, however, it is very difficult to perform it because reading the word activates an mental idea of color which is different from the color in which the word is written, which creates a conflict.

The parallelism between the Stroop effect and learning words in a foreign language is that when a person reads a word whose phonological form has been heard before, there will be a conflict between the phonological form that is remembered and the phonological form that is activated by reading the word, because the activated phonological form is affected by the conversion rules of the native language.

Another important issue in this matter is that the perception of language sounds is categorical. That is to say, when the speaker perceives a sound that is somewhere between the sounds "p" and "b", he/she usually interprets the sound as either a "p" or a "b", rather than interpreting it as a vague sound that somehow is similar to both of them. Then, if the sounds of the native language are introduced into the learning process, even if only by association with the written characters, it is reasonable to believe that these native sounds will create difficulties in perceiving the foreign sounds, because the categorical perception mechanism will tend to assimilate the foreign sounds to the native sounds.

In this respect, Borden et al say that "Even the sounds of speech are heard within the framework of our particular language, so that if we hear a less familiar language being spoken, we try to fit the less familiar sounds into the categories of speech sounds we have in our own language" [Borden et al (1994), p. 174].

Even in those cases of two phonetic languages in which the same transcription rules exist and there are no exceptions, the associations between characters and sounds can be different. For example, the stop sounds "p" and "t" have different characteristics in English and in Spanish. In these circumstances, when the learner sees a letter "p" will associate it with the sound "p" of his/her native language, instead of with the sound "p" of the foreign language.

On the other hand, if a person who is learning Spanish learns, for example, the sound [b] after the letter "b", besides suffering interference with other sound images that he/she might previously have for the letter "b", he/she will not perceive the fact that its associated phoneme is realized in different forms in Spanish, i.e. it has different allophones. For example the sound of "b" in the Spanish word "becerro" is different from the sound of "b" in the Spanish word "haber".

In general, learning a word is learning a sequence of sounds. If a person is learning words by learning a sequence of graphical characters, this learning will condition how the sequence of sounds that really correspond to the word is used.

The work of Ohala reinforces the idea that there is a strong link between visual form and sound form: "there is a growing body of evidence that much of what is regarded as native speakers' knowledge of the phonology of their language is very much influenced by, if not based on, their knowledge of how their language is spelled" [Ohala 1995, p. 716].

ESSENCE OF THE INVENTION

Introduction

As a result of the previous analysis, the invention believes that the main problem of the learners of pronunciation is the interference that exists between visual form and phonological form. In order to solve this problem, the present invention proposes a solution that allows to enjoy the advantages of written language without suffering its disadvantages.

The invention uses graphical entities that replace the writ en form of the target language. These graphical entities might be, for example, a line, or a sequence of characters, of a waveform, or other type of entity that has some linear characteristic. The invention creates a correspondence between the fragments of such graphical entities and the language fragments on which the learner is working, so that it allows the learner to indirectly access the content of the samples of target language that he/she is examining.

In order to facilitate the exposition of the invention, a few definitions will be provided in the next lines. In general, in this document the terms "learner" or "user" will be used for referring to the person that is using the invention with the purpose of developing his/her command of a target language.

The invention is used to work over a set of samples of a target language, each one of which is called in this invention ORIGINAL EXTRACT. Such original extracts can be obtained after contents in the target language which are larger than those on which the learner is working, or could have been created for the instruction of the target language.

For each original extract, the invention will use one of the graphical entities that were previously mentioned, which will be called BLIND EXTRACTS. Each blind extract corresponds to an original extract, and is created specifically for it. As was mentioned, such blind extract has a linear structure, and there is a certain correspondence between the fragments of the original extracts and the fragments of the blind extracts.

The blind extract is used to allow the learner to access to the different linguistic components of the original extracts, such as sounds, syllables, words, phrases and so on.

For example, Exhibit 1 shows a blind extract that has been built following the criteria of the preferred embodiment (which is described later on in this document) for the following example original extract "The man at the bar is eating a sandwich". As can be observed, each syllable of each word has been replaced by a character "X". Also, the spaces that separate words have been maintained.

Exhibit 1.

| Example original extract |
| --- |
| The man at the bar is eating a sandwich |
| Blind extract |
| X   X   X   X   X   X   XX   X   XX |
| Original extract divided in syllables |
| The man at the bar is ea-ting a sand-wich |

The invention also facilitates to identify the structure of the messages that are received. Several techniques can be used with that goal, including those techniques described in the patent application [Palacios 2003]. For example, Exhibit 2 shows the escalator tree of an example blind segment, in which the phrases that have been chosen are only those phrases that correspond to subordinate clauses.

Exhibit 2.

| Separated discrete blind extract escalator tree. |
| --- |
| X   X                                                    X X   XX |
|     X   X |
|         X   X   X   XX |
| Original extract |
| The man who came after the match finished is my father. |
| Escalator tree of the original extract |
| The man                                              is my father |
|    who came |
|         after the match finished |

As will be explained later, in the preferred embodiment the invention would be implemented in a computerized system that would allow to select fragments of the blind extract, and therefore access to the fragments of the original extract to which they correspond, and, for example, listen to the aural playback of them.

What is shown in Exhibit 2 is called the "phrase structure". The phrase structure of a sentence defines the hierarchical relationships between the words of a sentence. This is explained in books such as "Introduction to Government and Binding Theory", Blackwell Textbooks in Linguistics, 1994, by Liliane Haegeman. It is known in Linguistics that understanding the phrase structure of a sentence is critical for understanding the sentence.

Optionally, there could also be other interaction means, such as for example, with the goal of marking certain fragments of the blind extract with some special graphical means, or to obtain other type of information.

As can be seen, the blind extract can be used to distinguish the different words that exist in the aural production that is being listened to, and work on them, for example with the purpose of clarifying its meaning, without letting the learning of sounds be conditioned by the characters of written text.

The invention can be used in an isolated way or can be used simultaneously with other systems or methods that are orientated to the comprehension and/or the learning of languages. For example, it can be used with a system that is orientated to the comprehension of samples of a target language in which the learner has a special informative interest, as could be the case with documentaries, movies or other type of content.

Even though most of the explanation that follows will be centered in the learning of foreign languages, the invention can also be used for training a native language for individuals that might have some type of problem. This would be especially appropriate for persons to whom it is not advisable to show the written form of language, for any reason. This might happen, for example, in the case of individuals who could not read or write. It can also be appropriate for dyslexic individuals or individuals that suffer some type of aphasia.

ADVANTAGES OF THE INVENTION

As was mentioned before, the invention basically allows to discriminate words and identify the structure of the sentences without suffering the negative effects of prematurely working with written texts. In the next lines, some aspects will be explained about the difficulties related to word discrimination in order to better evaluate the contribution of the invention.

Word discrimination is an extremely difficult task that the mind of a normal native speaker performs surprisingly easily for the native language. Actually, science does not understand very well yet how it this task is performed [Anderson et al (2002)], [Kager, (1995)].

In the case of language learning in infants, Boysson-Bardies explains that "Of all the enigmas that have arisen in trying to understand how the child acquires the words of a language, the segmentation of speech during the fist year has remained the most disconcerting; even today, the way in which the child manages to distinguish and extract words from a continuous sound wave retains a certain mystery" [Boysson-Bardies (2001), p. 95].

Logically, a similar problem occurs in the case of learners of foreign languages. In this case, the learner has the apparent advantage that he/she unconsciously knows what he/she is looking for; but he/she also has other disadvantages, one of which is the immediate need to identify words to communicate with other people.

Children spend around two years until they utter their first words in their native language, while an adult or an older kid learning a second language would not want to wait so long. The invention allows learners to quickly learn the words of the target language without deteriorating the learning of phonetics and phonology.

Another important advantage of the invention has to do with the learning of languages in which the writing system is very complex, possibly not even based on phonemes, such as Chinese. In these cases, learners have many problems to use written language as support, but they can use instead the present invention.

In summary, the main advantages of the invention are:
1. to facilitate the learning of the sounds of the target language, which will produce a better listening comprehension, a better pronunciation, a better capacity for memorizing and learning of words, and indirectly a better integral learning of the language.
2. to allow to create associations between the phonological form and the visual form which are similar to the associations that native speakers create, so that reading comprehension will also be enhanced.

DESCRIPTION OF DRAWINGS

Exposition of One Embodiment

Description of Preferred Embodiment

General Description

It is understood that the purpose of this section is only to present a preferred embodiment, and that it does not have limitative effects on the invention.

In the preferred embodiment, the invention is created with a general purpose computer, which in this application will be called a computerized system, such as the Dell® Dimension XPS®, adding a mouse and a keyboard so that the user interacts with the system. In the computerized system there exists an operating system that can be, for example, Microsoft® Windows 2000®.

The computerized system contains a database in which a plurality of original extracts are stored. Such original extracts can come from a larger sample of language which is conveniently divided in original extracts, or they can be independent original extracts which have been chosen for any reason.

The computerized system also contains a computer program that manages and presents the different blind extracts, manages user interaction, generates aural playbacks and remark the fragments of the blind extracts that will be chosen. The computer program can be developed for example with a development environment such as Microsoft® Visual Basic 6.0®.

The computerized system also contains a database that contains examples, and those examples are appropriately indexed so that the user can select a given fragment of a blind extract and the system would have means to show a language sample which would be similar to the selected fragment. For example, if the user selects a fragment that corresponds to the words "house", the system might show examples such as "the house is big", "my house is in New York", or other examples. If the user selects the syllable "pu", the system might show examples such as "reputation" or "computer".

Types of Blind Extracts

In the preferred embodiment several types of blind extracts, containing different characteristics, are used with the purpose of providing additional information to the learner about the samples of the target language on which he/she is working.

In total, in the preferred embodiment there exist eight types of blind extracts, which are described in Exhibit 3.

Exhibit 3.
1. separated discrete syllabic structured blind extract,
2. separated continuous syllabic structured blind extract,
3. linked discrete syllabic structured blind extract,
4. linked continuous syllabic structured blind extract,
5. separated discrete syllabic non structured blind extract,
6. separated continuous syllabic non structured, blind extract
7. linked discrete syllabic non structured blind extract,
8. linked continuous syllabic non structured blind extract, As can be observed, the eight extracts vary in three features, which are explained in this section. Each feature can have two possible features, as explained below:

Feature 1: "separated/linked". Separated extracts show the spaces and punctuation marks that exist between words, while the linked extracts do not show them.

Feature 2: "discrete/continuous". In the discrete extracts, the syllabic structure corresponds to the syllables that exist in the words when the words are uttered independently; in the continuous extracts, the syllabic structure corresponds to the syllables that exist when the words are pronounced one after the other in the extract in a continuous way.

Feature 3: "structured/non structure". In the structured extracts there exists an internal codification that reflects the phrase structure of the original extract to which it corresponds; in the non structured extracts such internal structure does not exist.

In order to facilitate the exposition, the reference to the different types of extracts will be done as follows. When a blind extract is mentioned without specifying the value of any of the three possible features, it will be understood that reference is being made to extracts that can have both values, or to the blind extract or extracts that can be deduced from the context. For example, mentioning "blind extract" will mean that reference is being made to any of the eight types of extracts. Mentioning "blind extract" and specifying a feature, such as "discrete blind extract" will refer to any of the four extract types that have the feature "discrete", i.e. the separated discrete syllabic structured blind extract, the linked discrete syllabic structured blind extract, the separated discrete syllabic non structured blind extract, and the linked discrete syllabic non structured blind extract. As was mentioned, when the values of any of the features is not specified, the context will also be used to clarify which type of blind extract is being referred to.

The feature that has the values "structured/non structured" is different from the other features. The reason for having this feature is that the extracts can be internally structured in phrases. The structured extracts convey information about the phrases of the language sample that is being worked on. Their purpose is to generate the non structure extracts and to convey information about the phrases that exist.

In the explanation that follows it is understood that reference is made to the non structured extracts, because they are the ones which are shown to the user, but in the preferred embodiment there will exist a structured extract for each non structured extract.

In the preferred embodiment the blind extracts are generated linking "X" characters. This characters are grouped in CHAINS. Each chain of the blind extract is a group of characters that biunivocally corresponds with a word in the original extract.

In what follows, the different blind extracts that can exist in the invention are explained.

Separated Discrete Syllabic Blind Extract.

In the separated discrete syllabic blind extract the chains are visually separated thanks to the utilization of the punctuation marks that exist in the original extract, such as spaces, stops, etc. The blind extract shown in Exhibit 1 is a separated discrete blind extract. The characteristics of this blind extract are described in what follows.

1. each of the characters that make up the chains correspond to one syllable of the real word that is related to that chain,
2. words and chains are related in a biunivocal relation, so that there exist as many chains as real words there exist in the original extract.
3. the chains are separated by the same spaces or orthographic characters that separate the words that are related to those chains.

Separated Continuous Syllabic Blind Extract

This extracts takes into account the fact that when several words are uttered in a continuous way one after the other, the pronunciation of certain syllables is modified with respect to how they would be in the isolated words. This happens because of coarticulation phenomena and because of the prosodic rules of language. For example, the continuous production of the original extract shown in Exhibit 1 would contain the syllables shown in Exhibit 4.

Exhibit 4.

The-ma-nat-the-ba-ris-e-atin-ga-sand-wich

As can be seen, some syllables have been modified. In the continuous syllabic blind extract graphical means are used to link the syllables that are linked in the continuous pronunciation of the original extract. The characteristics of this extract in the preferred embodiment are the following.

1. using a hyphen ("-") for those syllables that belong to different words and get linked, so that the hyphen is located between the chains whose syllables are linked,
2. using an arrow ("→" o "←") for those syllables that exchange a fragment. The arrow would be located between the syllables that intervene in that exchange, and it would be orientated from the syllable that loses a fragment to the syllable that gains it.
3. using strikethrough font format for the syllables that disappear.
4. using red font format for the syllables that get transformed in any other way.

Exhibit 5 shows what the continuous blind extract would be for the original extract shown in Exhibit 1, using the criteria of the preferred embodiment.

Exhibit 5

| Separated continuous syllabic blind extract |
| --- |
| X    X→ X←X X→ X XX→ X XX |
| Example original extract |
| The man at the bar is eating a sandwich |
| Original extract divided in syllables in a continuous fashion |
| The-ma- nat- the-ba-ris-e-atin-ga-sand-wich |

Linked Discrete Syllabic Blind Extract and Linked Continuous Syllabic Blind Extract The continuous blind extract is used to show the fact that speech does not separate words with pauses. Even though in written language words are clearly separated by spaces or orthographic signs, this does not happen in speech. In speech the identification of the different words is done thanks to prosody, and sometimes thanks to some distinctive characteristics in how words are built.

Linked blind extracts aid the learner in discriminating the different words that make up speech. They are characterized because they do not have separations to indicate words. That is to say, the syllabic linked blind extracts are similar to the syllabic separated blind extracts, but they do not have separating characters between chains; the only thing that exists now is a consecutive collection of characters that represents the sounds of the extract. However, there still exist a correspondence between the syllables of the original extract and the characters of the linked blind extract that can be used to emphasize certain linguistic components.

There are two types of linked blind extract, as there were two types of separated blind extracts. The first one is the LINKED DISCRETE BLIND EXTRACT, which shows the syllables of the individual words of the original extract. The second one is the LINKED CONTINUOUS BLIND EXTRACT, which shows the syllables of the original extract when such original extract is pronounced in a continuous fashion.

Phrase Structure of the Blind Extracts

As was mentioned before, there exists the possibility in the invention to show the phrase structure of the original extract through the blind extract. The structured blind extract is used to do that; the appropriate phrases would have been defined in it previously.

Generation of Aural Playbacks

The computerize system comprises a speech technology system that allows to convert text into speech with a plurality of characteristics.

Reference Database

The computerized system contains a speech database which contains phonetic and phonologic information about the different words that are used in the extracts, and which covers both the case of the isolated word and the case in which the word is surrounded by other words. The database contains information about:

1. the syllabic structure of the words; for example, a word such as "house" would contain information such as "ho-use" which indicates that the word has two syllables;
2. the transformation rules for syllables for the continuous case, depending on the context where they are located; for example, a word such as "is" would contain information that would indicate that when it is followed by a word such as "special", the word "is" is linked to the "s" in "special"
3. the effects that the syntactic structure of extracts has on the phonological behavior of the segment sounds; for example, in the Spanish sentence "quiero reparar el techo de la casa antes de comer", the last syllable of the word "casa" does not link to the first syllable of the word "antes", because they are in different levels of the phrase structure of the sentence.

This database is the same database that is used in the speech technology system, but it can also be accessed to generate the blind extracts.

Composition of the Blind Extracts

In the preferred embodiment, the blind extracts are build by aggregating "X" characters. Each one of the "X" characters represents a syllable, except in the case in which some syllables link together or transform in some form in the continuous extract. In this case, a syllable of the continuous extract can correspond to two "X" characters linked with graphical means, as is explained below in this document.

Generation of the Blind Extracts

The separated discrete syllabic blind extract (SDSBE) is generated after the original extract by replacing each word by a group of "X" characters, so that each "X" character corresponds to a syllable of the word. For this task, the information that exists in the speech database about the syllabic structure of words is used.

The separated continuous syllabic blind extract (SCSBE) is generated using the SDSBE, applying to it the syllable transformation rules that exist in the speech database.

The linked discrete syllabic blind extract (LDSBE) is generated using the SDSBE, removing the orthographic characters that separate the chains.

The linked continuous syllabic blind extract (LCSBE) is generated using the SCSBE, removing the orthographic characters that separate the chains, but respecting the graphical means that mark the syllables that have been transformed.

System Execution

The computerized system comprises functionality to aurally reproduce the original extract, or a fragment of the original extract, in a plurality of ways that will be indicated below. For example, the reproduction can be done aurally emphasizing the words or syllables of certain phrases.

The computerized system has functionality to graphically emphasize parts of the blind extract, in a plurality of ways, either in an independent way or simultaneously to the reproduction of the original extract. With this functionality, when the original extract is reproduced, the system can graphically emphasize the words or syllables that are being pronounced ad each moment.

Utilization of the Invention

The preferred utilization of the invention would be done as follows. When starting the system, the user has the option to use it in training mode or in exploratory mode. In training mode, he/she would use predefined original extracts. In exploratory mode, he/she would use the original extracts that exist in a language sample in which he/she might be interested. In both cases, the result would be that the learner would sequentially choose one or more extracts.

The learner will generally work on the syllabic linked continuous blind extract, because it is the one that better reflects the nature of aural utterances. Also, the user will have the possibility to visualize any of the existing eight blind extracts that exist to work on them.

The computerized system of the preferred embodiment allows the user to select certain components of the original extracts by working on the blind extract, in order to get information about those components. This selection can be done also on the continuous blind extracts, even though they might have syllables that are linked to other syllables. Even if there are linked syllables, in the preferred embodiment there exist means for distinguishing the words that belong to those syllables that are linked, as shown in Exhibit 6, which represents the continuous extract of an original extract. In the Exhibit, the user has selected the first part of the syllable "ris" and the invention has detected that it is the end of the word "bar" and has selected it wholly.

Exhibit 6

| Separated continuous syllabic blind extract |
| --- |
| X   X→ X←X X→ X XX→ X XX |
| Example original extract |
| The man at the bar is eating a sandwich |
| Original extract divided into syllables in continuous fashion |
| The-ma- nat- the-ba-ris-e-atin-ga-sand-wich |

In order to perform the selection of a fragment, the user first selects one or more characters of the blind extract, and the system identifies the parts of the original extract that correspond to those characters. In order to do that, when the user selects a fragment of the extract, the system would graphically emphasize the word and the phrase in which it is located, and it could show the syllables that are involved in the selection. At this moment, the user can choose between the following three possibilities:

1. one or several phrases,
2. one or several words,
3. one or several syllables, Once some components of the extract have been selected, the invention can offer the user different types of information about those components.

1. One type of information can be other texts that contain the same types of components that have been selected, syllables words or phrases, which could be emphasized.
2. Another type of information is the aural reproduction of a fragment of the extract, which can be the whole extract.

The aural reproduction can also be performed for the examples that have been mentioned in the previous lines.

3. Another type of information would be provided by generating aural reproductions on the original extract or on a fragment of it, but applying certain characteristics that would facilitate learner comprehension. These special characteristics can be achieved by modifying the speed of the reproduction, either globally or locally, or by modifying the tone, intensity and/or duration of the sound segments that exist in the fragment. This reproduction can be performed by special recordings that would have been made previously, or by the utilization of text to speech converters, or by using both ways. The different types of reproduction might have the following characteristics:

Playback the fragment at a lower speed than normal.

Playback the fragment aurally emphasizing the syllables, i.e., marking the different syllables, in order to help the learner to identify the different syllables.

Playback the fragment word by word, in order to facilitate the identification of the different words.

Playback the fragment aurally emphasizing certain parts of the fragment, which can be segments, syllables, words or phrases.

Playback the fragment amplifying the frequencies that are located around 2000 Hz, in order to facilitate the distinction of the information that is located in that part of the spectrum, which is specially important for discriminating fricative sounds [Borden et al, p. 177].

4. Another type of information would be provided by graphically marking different parts of the fragment, either in synchronization to the aural reproduction or independently. The synchronized reproduction is specially useful in the case in which certain parts of the fragments are being aurally emphasized.

When using the invention, it would be advisable to provide slow reproductions at the beginning of the instruction and gradually increase the speed to assist the learner. It is also important to include reproductions done at normal speed from the beginning, so that the learner is exposed to authentic language.

The ideal moment to start using the invention in the case of foreign language learning is the beginning of the instruction, but it can also be used for learners that have already started the instruction, with the goal of eliminating those incorrect habits that they might have acquired.

The invention can be used in all kinds of exercises and activities in which there is a fragment of aural language that contains certain information for the learner. In this case, the invention would allow the learner to listen to the information and review parts of it without having to look at the written form, with the result training in listening skills.

Description of Other Embodiments

There are many alternative ways to build the invention, and some of them will be described in this section.

In an alternative embodiment, the graphical means that are used for the blind extract are not characters; it is possible to use, for example, a hyphen, as shown in Exhibit 7. It can be seen that in one of the cells, the blind extract has been horizontally elongated in order to align it with the original extract. It could also be possible to use a waveform diagram or any other type of graphical means.

Exhibit 7.

---
Example original extract

The man at the bar is eating a sandwich
Blind Extract

- - - - - - — - —

Blind Extract that Has Been Adapted to the Original Extract

- - - - - - — - —

Original extract divided in syllables

The man at the bar is ea-ting a sand-wich

---

When the blind extract is created using graphical means which are not characters, the different parts of the original extract could correspond to different fragments of the extract. In other embodiment, the blind extracts use characters different from "X". In general, it is advisable that the characters that are used do not exist in the target language nor in the native language of the learner, in order to reduce the interference between written form and sound form.

In another alternative embodiment, the different fragments of the separated blind extract are separated by other graphical means different from the spaces and orthographic characters that are used in the preferred embodiment, so that they could be separated by special characters or by geometric figures such as lines or other figures.

In another alternative embodiment, the separated blind extract could contain a chain that would correspond to more than a word of the original extract; for example, the words "the man" might be associated to a chain such as "XX".

In another alternative embodiment, the blind extract might contain some of the words that exist in the original extract; for example, an original extract such as "the man lives in Madrid" might generate an separated discrete syllabic blind extract such as "the man X X XX".

In another alternative embodiment, not the whole original extract would be included in the blind extract, or it might happen that some parts of the blind extract would not correspond to any part of the original extract.

Besides general purpose computers (which in this applications are called computerized systems), the invention can be embodied in different types of non computerized electronic systems, which might also use integrated circuits and microprocessors. This system would show the blind extracts and play back the audio fragments. Also, it is readily obvious that the same can be attained utilizing two or more electronic systems used in coordination. One of said systems would be used for showing the blind extracts and another one would be used for playing back the audio fragments.

A possible example of said non computerized electronic system would be a interactive television system. The television screen would show the blind extracts and the audio of the television would create the aural reproductions. As in the previous case, some fragments of the blind extracts that appear on the screen might be graphically emphasized, and they can also be aurally emphasized in the aural reproductions.

Another possible embodiment uses SEGMENTAL BLIND EXTRACTS, which Show the sound segments that make up the syllables. The segments are the sound units identified in speech that make up the syllables. That is to say, segments are sounds that last shorter time than the syllable length. Segments can be equated with phonems, even though there are several situations in which there is no general consensus about their relationship. In general, when speech is put in written form, each segment can be represented by a graphical object. An introductory description of segments is provided in Ray Jackendoff's "Foundations of Language".2002, Oxford University Press. Using segmental extracts creates the following additional types of extracts.

1. separated discrete segmental structured blind extract,
2. separated continuous segmental structured blind extract,
3. linked discrete segmental structured blind extract,
4. linked continuous segmental structured blind extract,
5. separated discrete segmental non structured blind extract,
6. separated continuous segmental non structured, blind extract
7. linked discrete segmental non structured blind extract,
8. linked continuous segmental non structured blind extract,

The invention claimed is:

1. A system for facilitating language learning wherein said system is used upon samples of a target language, wherein each of said samples is called in this invention ORIGINAL EXTRACT,
   said target language is a foreign language or is the native language of the learner,
   wherein said system comprises:
   a) a display apparatus,
   b) a memory containing information related to said original extracts,
   c) control logic means to show one or more BLIND EXTRACTS for at least one of said original extracts, wherein
   a blind extract is a graphical entity whose fragments have certain correspondence with fragments of an original extract, said original extract being associated to said blind extract,
   a blind extract is made up of one or more fragments,
   the fragments of a blind extract are created by replacing the sounds of said fragments of said original extract by graphical objects that are different from the letters associated to said sounds in said target language,
   d) means to prevent the user from watching text that represents said language sample while the user is watching said blind extract,
   e) control logic means to choose at least a fragment of a blind extract wherein said fragment is associated to a fragment of an original extract,
   f) means to generate information about said fragment of an original extract which is associated to said fragment of a blind extract,
   and wherein at least two of the linguistic entities which are included in said sample of target language and which have different pronunciation from each other are represented by graphical objects which display the same information, wherein a linguistic entity is an entity of any of the following plurality of types: sentences, phrases, words, syllables, or phonemes,
   and wherein said system is used in isolation or as a complement to other language orientated system, for facilitating foreign language learning or for correcting a problem in the utilization of the native language.

2. A system as claimed in claim 1, comprising at least a blind extract that is a SEGMENTAL BLIND EXTRACT, whose distinguishing feature is that it is divided into parts which are visually differentiated and which correspond to the segments of the words of said original extract, wherein said segments are units of sound of lower level than syllables.

3. A system as claimed in claim 1, further comprising means to graphically emphasize certain parts of at least one blind extract among said blind extracts.

4. A system as claimed in claim 3, wherein said graphical emphasizing is performed simultaneously to the aural reproduction of a fragment of the extract, so that the parts that are reproduced at a given moment are approximately the same parts that are graphically emphasized at the same moment.

5. A system as claimed in claim 1, further comprising means to show in some way the phrase structure of at least one of said blind extracts.

6. A system as claimed in claim 1, wherein said information about said fragment of an original extract is one of the following types of information:
   a playback of said fragment of original extract,
   information to clarify the meaning of said fragment of original extract,
   example texts where similar fragments appear.

7. A system as claimed in claim 1, comprising at least a blind extract which is a SYLABIC BLIND EXTRACT, whose distinguishing feature is that it is divided into parts which are differentiated visually and which correspond to the syllables of said original extract.

8. A system as claimed in claim 1, comprising at least a blind extract whose distinguishing feature is that it is divided into parts which are differentiated visually and which correspond to the words of said original extract.

9. A method for facilitating language learning, said method being executed upon one or more computerized systems, wherein
   said method is used upon samples of a target language, wherein each of said samples is called in this invention ORIGINAL EXTRACT,
   said target language is a foreign language or is the native language of the learner,
   wherein said method comprises the steps of:
   a) displaying one or more BLIND EXTRACTS in computer monitor for at least one of said original extracts, wherein
   a blind extract is a graphical entity whose fragments have certain correspondence with fragments of an original extract, said original extract being associated to said blind extract,
   a blind extract is made up of one or more fragments,
   the fragments of a blind extract are created by replacing the sounds of said fragments of said original extract by graphical objects that are different from the letters associated to said sounds in said target language,
   b) preventing the user from watching text that represents said language sample while the user is watching said blind extract,
   c) choosing at least a fragment of a blind extract by using a computer interaction device, wherein said fragment is associated to a fragment of an original extract,
   d) said computerized system generating and providing information about said fragment of an original extract which is associated to said fragment of a blind extract,
   and wherein at least two of the linguistic entities which are included in said sample of target language and which have different pronunciation from each other are represented by graphical objects which display the same information, wherein a linguistic entity is an entity of any of the following plurality of types: sentences, phrases, words, syllables, or phonemes,
   and wherein said steps is performed in isolation or as a complement to other language orientated system, for facilitating foreign language learning or for correcting a problem in the utilization of the native language.

10. A system as claimed in claim 1 wherein said means to prevent the user from watching said text is means to prevent said text from appearing on said display.

11. A system as claimed in claim 1 wherein said means to prevent the user from watching said text is one or more of the following plurality of means:
   a) means to instruct the user not to look at said text, in case said text is being shown
   b) means to place said text at a distance from said blind extract, said distance being higher than 20% of the total horizontal span covered by said blind extracts
   c) means to present said text with a color that is different from the color of said blind extract
   d) means to present said text with a font type that is different from the font type of said blind extract
   e) means to present said text with a font size that is sufficiently small to make it difficult to read to the regular person.

12. A method as claimed in claim 9, wherein said information about said fragment of an original extract is one of the following types of information:
   a playback of said fragment of original extract,
   information to clarify the meaning of said fragment of original extract,
   example texts where similar fragments appear.

13. A method as claimed in claim 9, comprising at least a blind extract that is a SEGMENTUAL BLIND EXTRACT, whose distinguishing features is that it is divided in parts which are visually differentiated and which correspond to the segments of the words of said original extract, wherein said segments are units of sound of lower level than syllables.

14. A method as claimed in claim 9, further comprising the step of graphically emphasizing certain parts of at least one blind extract among said blind extracts.

15. A method as claimed in claim 14, wherein said graphical emphasizing is performed simultaneously to the aural reproduction of a fragment of the extract, so that the parts that are reproduced at a given moment are approximately the same parts that are graphically emphasized at the same moment.

16. A method as claimed in claim 9, further comprising the step of showing the phrase structure of at least one of said blind extracts.

17. A method as claimed in claim 9, wherein at least one of said blind extracts is a blind extract which is a SYLABIC BLIND EXTRACT, whose distinguishing feature is that it is divided into parts which are differentiated visually and which correspond to the syllables of said original extract.

18. A method as claimed in claim 9, wherein at least one of said blind extracts is a blind extract whose distinguishing feature is that it is divided into parts which are differentiated visually and which correspond to the words of said original extract.

19. A method as claimed in claim 9 wherein said step to prevent the user from watching said text is preventing said text from appearing on said display.

20. A method as claimed in. claim 9 wherein said step to prevent the user from watching said text is one or more of the following plurality of steps:
   a) instructing the user not to look at said text, in case said text is being shown
   b) placing said text at a distance from said blind extract, said distance being higher than 20% of the total horizontal span covered by said blind extracts
   c) presenting said text with a color that is different from the color of said blind extract
   d) presenting said text with a font type that is different from the font type of said blind extract e) presenting said text with a font size that is sufficiently small to make it difficult to read to the regular person.

21. A non transitory computer readable medium containing computer executable instructions that, when executed by one or more processors one or more computers, allows said one of more processors to perform the following steps:
   a) managing samples of a target language, wherein each of said samples is called in this invention ORIGINAL EXTRACT, wherein said target language is a foreign language or is the native language of the learner,
   b) displaying one or more BLIND EXTRACTS for at least one of said original extracts,
   wherein
   a blind extract is a graphical entity whose fragments have certain correspondence with fragments of an original extract, said original extract being associated to said blind extract,
   a blind extract is made up of one or more fragments,
   the fragments of a blind extract are created by replacing the sounds of said fragments of said original extract by graphical objects that are different from the letters associated to said sounds in said target language,
   c) preventing the user from watching text that represents said language sample while the user is watching said blind extract,
   d) choosing at least a fragment of a blind extract of said blind extracts wherein said fragment is associated to a fragment of an original extract of said original extracts,
   e) generating information about said fragment of an original extract which is associated to said fragment of a blind extract,
   and wherein at least two of the linguistic entities which are included in said sample of target language and which have different pronunciation from each other are represented by graphical objects which display the same information, wherein a linguistic entity is an entity of any of the following plurality of types: sentences, phrases, words, syllables, or phonemes,
   and wherein said steps is performed in isolation or as a complement to other language orientated system, for facilitating foreign language learning or for correcting a problem in the utilization of the native language.

22. A non transitory computer readable medium containing a data set that, when interpreted by one or more processors of one or more computers, allows said one of more processors to perform the following steps:
   a) managing samples of a target language, wherein each of said samples is called in this invention ORIGINAL EXTRACT, wherein said target language is a foreign language or is the native language of the learner,
   b) displaying one or more BLIND EXTRACTS for at least one of said original extracts, wherein
   a blind extract is a graphical entity whose fragments have certain correspondence with fragments of an original extract, said original extract being associated to said blind extract,
   a blind extract is made up of one or more fragments,
   the fragments of a blind extract are created by replacing the sounds of said fragments of said original extract by graphical objects that are different from the letters associated to said sounds in said target language,
   c) preventing the user from watching text that represents said language sample while the user is watching said blind extract,
   d) choosing at least a fragment of a blind extract of said blind extracts wherein said fragment is associated to a fragment of an original extract of said original extracts,
   e) generating information about said fragment of an original extract which is associated to said fragment of a blind extract,
   and wherein at least two of the linguistic entities which are included in said sample of target language and which have different pronunciation from each other are represented by graphical objects which display the same information, wherein a linguistic entity is an entity of any of the following plurality of types: sentences, phrases, words, syllables, or phonemes,
   and wherein said steps is performed in isolation or as a complement to other language orientated system, for facilitating foreign language learning or for correcting a problem in the utilization of the native language.

\* \* \* \* \*